US009200979B2

(12) United States Patent
Goodman et al.

(10) Patent No.: US 9,200,979 B2
(45) Date of Patent: Dec. 1, 2015

(54) SYSTEM FOR BEARING FAULT DETECTION

(75) Inventors: Mark A. Goodman, Cortlandt Manor, NY (US); William Bishop, Pleasantville, NY (US); Gary Mohr, Cortlandt Manor, NY (US)

(73) Assignee: U.E. SYSTEMS, INC., Elmsford, NY (US)

( * ) Notice: Subject to any disclaimer, the term of this patent is extended or adjusted under 35 U.S.C. 154(b) by 756 days.

(21) Appl. No.: 13/469,476

(22) Filed: May 11, 2012

(65) Prior Publication Data

US 2012/0316796 A1    Dec. 13, 2012

Related U.S. Application Data

(63) Continuation-in-part of application No. 13/088,195, filed on Apr. 15, 2011, now Pat. No. 8,707,785, which is a continuation-in-part of application No. 13/088,212, filed on Apr. 15, 2011, now Pat. No. 8,746,068.

(60) Provisional application No. 61/484,932, filed on May 11, 2011.

(51) Int. Cl.
    *G01N 29/00*      (2006.01)
    *G01M 13/02*      (2006.01)
    *G01M 13/04*      (2006.01)

(52) U.S. Cl.
    CPC .......... *G01M 13/028* (2013.01); *G01M 13/045* (2013.01)

(58) Field of Classification Search
    CPC ........................ G01M 13/028; G01M 13/045

USPC ................... 367/153, 154, 162, 176; 381/352
See application file for complete search history.

(56) References Cited

U.S. PATENT DOCUMENTS

| | | | | |
|---|---|---|---|---|
| 3,964,014 A | * | 6/1976 | Tehon | 367/155 |
| 4,027,242 A | * | 5/1977 | Yamanaka | 455/76 |
| 4,034,332 A | * | 7/1977 | Alais | 367/153 |
| 4,629,834 A | * | 12/1986 | Waggoner et al. | 381/316 |
| 4,987,769 A | | 1/1991 | Peacock | |
| 5,089,997 A | * | 2/1992 | Pecukonis | 367/135 |
| RE33,977 E | | 6/1992 | Goodman | |

(Continued)

OTHER PUBLICATIONS

U.S. Appl. No. 13/088,212, Mark A. Goodman.

(Continued)

*Primary Examiner* — Laura Martin
*Assistant Examiner* — Samir M Shah
(74) *Attorney, Agent, or Firm* — Leason Ellis LLP

(57) ABSTRACT

The present invention is directed an ultrasonic frequencies fault detecting apparatus. The present invention uses high frequency ultrasonic energy signals to analyze bearings and determine the presence of faults therein. The ultrasonic return signals are heterodyned (by amplitude demodulation) into the audio spectrum for purposes of audio detection. In addition, a FFT spectrum of the signal is displayed on a monitor for more accurate results. According to the present invention software is used to automatically analyze the FFT spectrum by comparing the current spectrum with stored spectrums of known bearing conditions as modified based on the rotary speed of the bearing and the number of balls. Once a defect in a bearing has been located in this manner using automated FFT analysis, an operator can then use a device, such as a calibrated lubricant dispenser, to effectuate maintenance and/or repair.

8 Claims, 5 Drawing Sheets

(56) References Cited

U.S. PATENT DOCUMENTS

| | | | |
|---|---|---|---|
| 5,172,597 A * | 12/1992 | Hedeen | 73/646 |
| 5,267,221 A * | 11/1993 | Miller et al. | 367/140 |
| 5,432,755 A * | 7/1995 | Komninos | 367/135 |
| 6,078,874 A * | 6/2000 | Piety et al. | 702/122 |
| 6,122,966 A | 9/2000 | Goodman | |
| 6,247,353 B1 * | 6/2001 | Battenberg et al. | 73/40.5 A |
| 6,339,961 B1 | 1/2002 | Goodman | |
| 6,707,762 B1 | 3/2004 | Goodman | |
| 6,804,992 B2 | 10/2004 | Goodman | |
| 6,996,030 B2 * | 2/2006 | Goodman et al. | 367/176 |
| 7,133,801 B2 * | 11/2006 | Song | 702/145 |
| 2004/0090867 A1 * | 5/2004 | Goodman et al. | 367/135 |
| 2006/0209632 A1 * | 9/2006 | Goodman et al. | 367/13 |
| 2007/0204695 A1 * | 9/2007 | Gross et al. | 73/585 |

OTHER PUBLICATIONS

U.S. Appl. No. 13/088,195, Mark A. Goodman.

* cited by examiner

101

103

SYSTEM FOR BEARING FAULT DETECTION

CROSS-REFERENCE TO RELATED APPLICATION

This application claims the benefit of U.S. Provisional Patent Application Ser. No. 61/484,932, filed May 11, 2011 and entitled SYSTEM FOR BEARING FAULT DETECTION, the contents of which are herein incorporated by reference in its entirety. This application is also a continuation in-part of and claims the benefit of U.S. patent application Ser. No. 13/088,195 entitled ON-BOARD ULTRASONIC FREQUENCY SPECTRUM AND IMAGE GENERATION and U.S. patent application Ser. No. 13/088,212 entitled ULTRASONICALLY CONTROLLABLE GREASE DISPENSING TOOL, both filed Apr. 15, 2011, the contents of which are herein incorporated by reference in their entirety.

BACKGROUND OF THE INVENTION

1. Field of the Invention

The invention relates generally to the use of Fast Fourier Transformations (FFT) for the visual identification of faults in roller bearing elements, by analysis of ultrasonic frequency emissions resulting therefrom.

2. Description of the Related Art

Ultrasonic sensors have been used in the past to detect ultrasonic energy generated by friction within mechanical devices, such as that created by deteriorated bearings, as disclosed in U.S. Pat. No. Re. 33,977 to Goodman, et al., the contents of which are hereby incorporated herein by reference in their entirety. The greater the amount of friction, the greater is the intensity of the generated ultrasonic energy. Applying a lubricant to the device reduces friction and consequently reduces the intensity of the generated ultrasound. Measuring ultrasonic energy thus provides a way to determine when lubrication has reached the friction generating surfaces. Additionally, faulty devices, such as bearings, generate a higher level of ultrasonic energy than do good bearings and thus, whether the bearings are good or bad can also be detected.

In the past, decisions have been made on when to lubricate bearings based on the amount of time that has passed since the last application of lubricant and the specific amount of lubricant added at that time. Typically, this information was compared to manufacturer's recommendations. However, a major reason for bearing failure is improper lubrication, not just a failure to lubricate. In particular, over lubrication can be a problem. It is known in the art to combine a lubrication tool with an ultrasonic detector to help control the application of lubricant to bearings. Such devices are disclosed in U.S. Pat. No. 6,122,966 and No. 6,339,961 of Goodman et al., the contents of which are incorporated herein by reference in their entirety.

As indicated in U.S. Published Patent Application US2006/0209632-A of Goodman, the details of which are hereby incorporated herein by reference in their entirety, both motors and electrical discharges in electrical cabinets used in large facilities may be positioned at widely separated locations. Thus, in order to monitor these motors and cabinets, maintenance personnel need to travel to these locations to make the ultrasonic tests. Thus, a route of travel needs to be defined, and the ultrasonic equipment must be portable and should be light weight, but still have the capacity to conduct the necessary tests.

Since acoustic energy created by faulty bearings is detectable in both the audible and ultrasonic frequency ranges, wherein the ultrasonic range is generally defined to be in the range of 28 kHz to 40 kHz, in noisy environments the audible components are too difficult to detect with the unaided human ear. However, the ultrasonic component is easily detected and located. Thus, means are typically provided for heterodyning, or demodulating, the detected ultrasonic signal into the audio range, and various schemes are available for doing this.

When using ultrasonic energy to detect leaks, deteriorating bearings, electrical discharges or other malfunctions, it is useful to have a portable ultrasonic sensor which indicates the presence and intensity of ultrasonic energy both visually and audibly. U.S. Pat. No. Re, 33,977 to Goodman et al. discloses an ultrasonic sensor that displays the intensity of the detected signal on an output meter operable in either linear or logarithmic mode, and also provides for audio output through headphones. U.S. Pat. No. 4,987,769 to Peacock et al. discloses an ultrasonic detector that displays the amplitude of the detected ultrasonic signal on a ten-stage logarithmic LED display. However, the detector disclosed in Peacock does not process the detected signal to produce an audible response, nor does it provide for signal attenuation after the initial pre-amplification stage.

A portable device which has been used in the past to detect ultrasonic energy is the UE 10,000 made by U.E. Systems of Elmsford, N.Y. This device is covered by U.S. Pat. No. 6,707, 762, U.S. Pat. No. 6,804,992 and U.S. Pat. No. 6,996,030 to Goodman et al, which are incorporated herein by reference in their entirety. The UP 10,000 detects ultrasonic signals from deteriorated bearings and demodulates or heterodynes the signals to the audio range. These signals can then be heard by an operator through headphones or the signal can be viewed on a display as a way of detecting malfunctions. The heterodyned audio signal can be saved and later downloaded to an external spectrum analyzer in order to make more precise determinations of the status of the bearings. However, the applications identified above with Ser. Nos. 13/088,195 and 13/088,212 disclose spectrum analysis using Fast Fourier Transform (FFT) analysis directly on a light weight portable ultrasonic detection device.

SUMMARY OF THE INVENTION

The present invention is directed to determining a bearing fault by analyzing ultrasonic frequencies produced thereby. This is accomplished by detecting the high frequency energy generated by the impacts of the roller elements on a particular bearing. These high frequency ultrasonic energy signals can be heterodyned (by amplitude demodulation) into the audio spectrum for purposes of audio detection. In addition, the FFT spectrum of the signal can be displayed on a monitor for more accurate results. According to the present invention software is used to automatically analyze the FFT spectrum by comparing the current spectrum with stored spectrums of known bearing conditions as modified based on the rotary speed of the bearing and the number of balls. Once a defect in a bearing has been located in this manner using automated FFT analysis, an operator can then use a device, such as a calibrated lubricant dispenser, to effectuate maintenance and/or repair.

The present invention involves the use of integrated FFT based bearing fault determination software. The integrated software package operates in conjunction with an ultrasonic spectrum detector so as to provide an improved apparatus and method for using an ultrasonic detector with on-board spectrum analysis to detect faults in the bearings of machinery FFT analysis is very useful for the visual identification of fault frequencies in roller bearings. There are four types of common faults or defects that occur with these bearing: outer race defect; inner race defect; ball defect; and bearing cage defect. Each of these types of defects will generate a specific fault frequency spectrum when the bearing is rotate at a specific speed. Furthermore, the fault frequency spectrum will be more pronounced when the bearing is under load.

The present invention provides an improvement over the traditional methods of detecting bearing faults. In the past one way of detecting bearing faults involved vibration monitoring using accelerometers. When monitoring a bearing with an accelerometer the signal that is generated is fairly broad band and contains many spurious frequency components that are not related to the four common types of defects. The present invention provides a system of analyzing fault frequencies that simplifies detection of specific bearing faults.

Additionally, traditional techniques for detecting bearing defects relied on low-frequency spectrum libraries of the known bearing fault frequencies provided by the bearing manufacturer. These libraries functioned as lookup tables that provided a list of specific fault frequencies for a particular bearing turning at a specified rotational speed (revolutions per minute, rpm). The present invention incorporates that data into an automatic fault detection system that detects one of the fault types.

In an embodiment of the present invention, the FFT bearing frequency calculator operates as a discrete or embeddable software package that calculates bearing defect fault frequencies or spectrums automatically based on specific bearing parameters that are entered by a user, e.g., bearing type, number of bearings, speed, etc. When combined with an ultrasonic detector device, the software package can be integrated into a combined work flow control module. This module can be configured to interact with additional components such as lubrication sensors and lubrication dispensers. The software integrated control module can either be a standalone detection unit or integral with the other maintenance devices. In such an arrangement the ultrasonic fault detector would have the on-board ability to make measurements and display results, e.g., dB levels or FFT spectrums of measured ultrasonic signals, which can be used to determine the lubrication needed for a bearing. It includes a lubricant flow monitor to measure and control the amount of lubrication (grease) that is being dispensed. Data on the amount of lubricant dispensed at any one time is stored on board the ultrasonic device. Further information on the type of lubricant used can be stored along with information on the amount of lubricant used for each bearing.

In another embodiment of the present invention, the software control module can connect to a Bluetooth circuit. This circuit allows the conversion of audio signals into short range wireless signals that can be picked up by a head set worn by the operator. This eliminates the need for a cable connecting the headphones to the portable unit.

It is a further improvement to use the Bluetooth and/or Wi-Fi connections to transmit the FFT data to a base station or computer network. Additionally, the Bluetooth and/or Wi-Fi connections can be used to connect and exchange data with any wirelessly equipped data monitoring device.

A further improvement that can be provided by the present invention is storage on the portable detector for the recording of prior heterodyned audio signals and/or spectrums. As a result, the diagnoses of the fault condition can be even more precise because the sound and/or spectrum at one or more past times can be compared in real time to the current sound and/or spectrum on the portable device at the location of the test motor or electrical cabinet. Using the Bluetooth and/or Wi-Fi connections, a central maintenance operation can be immediately notified of an imminent fault detected in this manner.

The storage of heterodyned ultrasound, images and spectrums can be on removable media cards such as an SD or other removable media type. This allows information to be easily uploaded to a central computer or downloaded to the portable hand-held ultrasonic detector.

Additional features, advantages, and embodiments of the invention may be set forth or apparent from consideration of the following detailed description, drawings, and claims. It is to be understood that both the foregoing summary of the invention and the following detailed description are exemplary and intended to provide further explanation without limiting the scope of the invention as claimed.

BRIEF DESCRIPTION OF THE DRAWINGS

The foregoing and following descriptions of the invention will be better understood by reference to the detailed description taken in conjunction with the accompanying drawings, in which.

DETAILED DESCRIPTION OF THE PREFERRED EMBODIMENT

Figure 1:
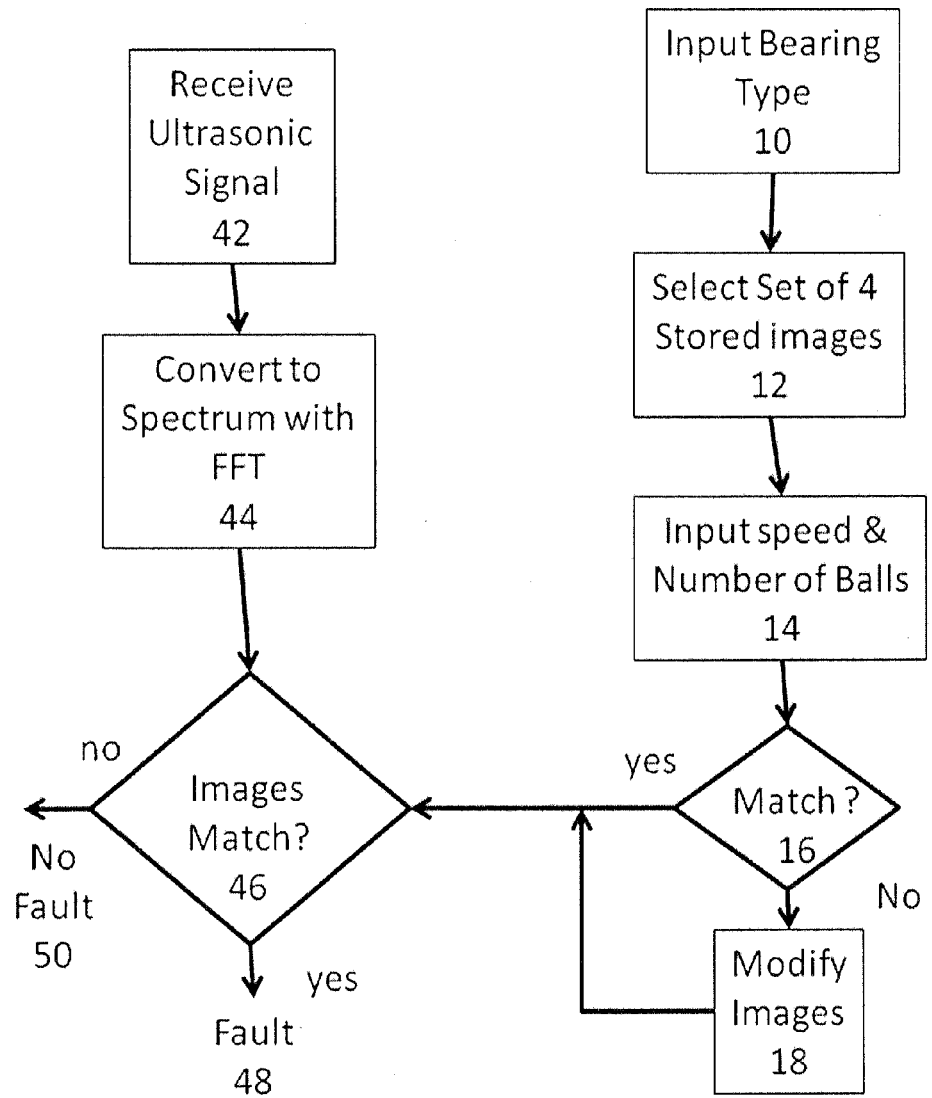
FIG. 1 is a block diagram of the software module that automatically determines bearing faults.
Figure 4:
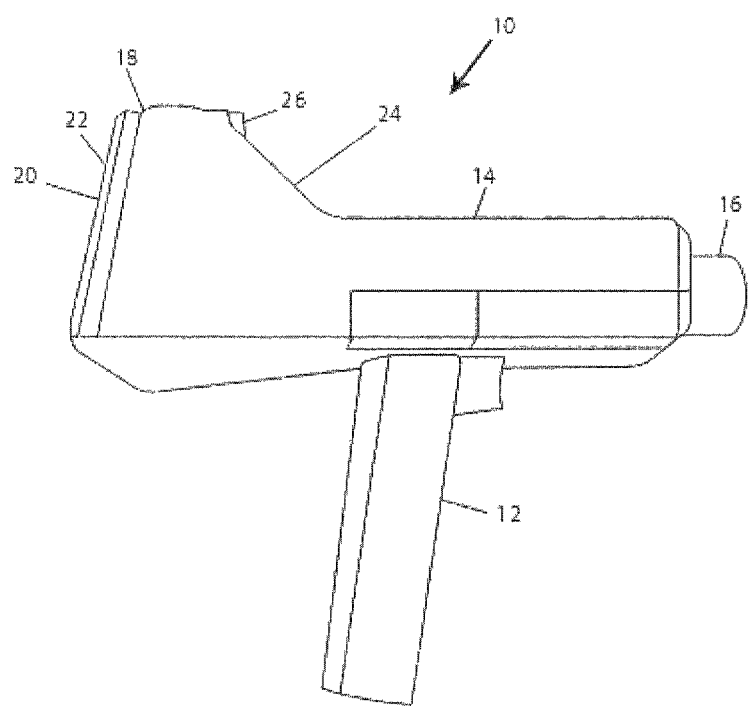
FIG. 4 is the rear view of an ultrasonic handheld device showing components thereof.

Referring now to the drawings wherein like references numerals designate corresponding parts throughout the several views. FIG. 1 is a flow chart of the operation of the software according to the present invention for automatically determining bearing faults. The process starts at step 10 when the operator inputs information on the type of bearing used in the motor under test. The input can be by means of a touch screen 20 located on the back of the hand-held ultrasonic detector unit as shown in FIG. 4. The input of the bearing type causes the software in step 12 to populate a database with data representing a typical; spectra response when that type of ball bearing has one of 4 specific fault types based on the fault frequency. For example, the database is constructed and populated using an algorithm to determine several common types of fault (1) an outer race defect, (2) an inner race defect, (3) a ball defect and (4) a bearing cage defect. The algorithm uses specific inputs such as a predetermined number of balls turning at a predetermined speed to generate the entries.

Figure 2:
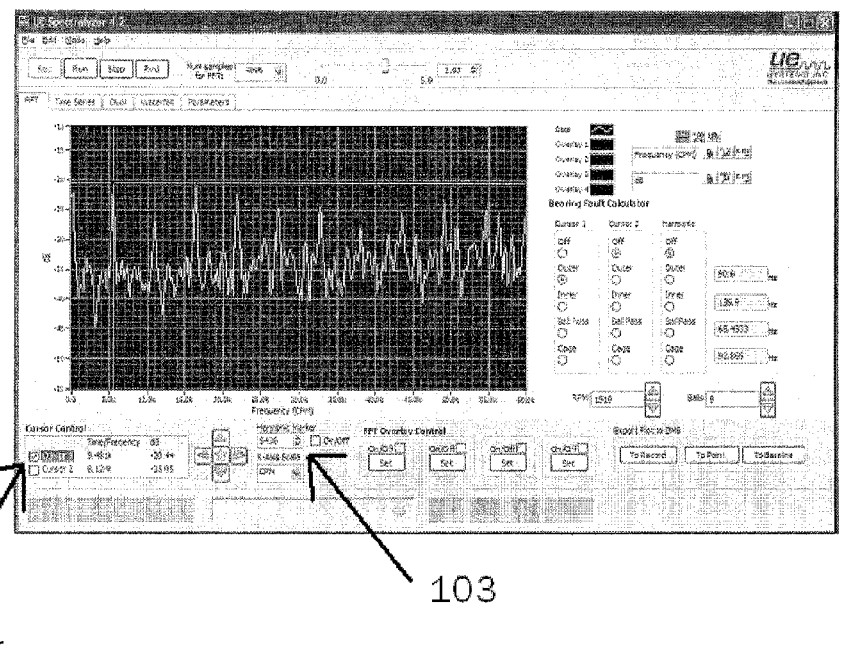
FIG. 2 is a screen capture of the display of the FFT transformation generated by the software module.

In step 16 the user inputs the actual number of balls in the bearing under test and the actual speed. In step 14 a determination is made, such as the placement of a marker, as to whether the speed and number of balls input by the user match the predetermined values. If there is a match, no change is made to the data set. However, in step 18 the algorithms are modify the data set when the actual values for the number of balls and the speed are different than the default values. FIG. 2 shows a display of an FFT signal for a faulty bearing generated by the fault frequency calculator software package of the present invention. If the number of balls in the actual bearing is higher than the predetermined value, the marker corresponding to the frequency determined by the fault frequency counter is made higher by the modifier. It is correspondingly made lower if there are fewer balls in the bearing. In a similar fashion if the bearing is rotating at a higher speed than the predetermined value the marker is made higher and it is made lower if the frequency is lower than the predetermined value.

By using the fault frequency modifier, the storage requirements of the system are reduced. In particular, it is only necessary to store four sets of fault data relating to each type of bearing, as opposed to data for the four failure conditions at each of a plurality of speeds and numbers of balls. However, it is not beyond the scope of the present invention to store these pluralities of sets of fault data and to have the user input the bearing type, number of balls and speed at one time and to have the software select the appropriate four failure fault types from the database.

Once the four fault types are determined using the bearing condition inputs, the user at step 42 can proceed to take a measurement of the ultrasonic signal generated by the bearing under test. This signal is subjected to an FFT and/or time series analysis in step 44 so that a spectrum o frequency, like that depicted in FIG. 2, is generated. In one embodiment, a time series analysis is solely used to determine the fault condition due to the rotational speed of the bearing being insufficient to generate the necessary input frequency for the FFT analysis. In step 46, the actual spectrum and time series analysis results are compared to each of the four fault types either as stored or as modified by the fault frequency modifier. If there is a match within predetermined limits, the comparator software in step 48 can automatically determine and announce the existence of one of the four fault conditions. However, if there is no match, in step 50 there is an indication that the bearing has not failed. Depending on the amplitude of the ultrasonic or FFT signal, the system may indicate that lubricant is needed or that the bearing is operating fine as it is.

The comparator can be a curve comparator software module that determines which of the four spectrums most closely matches the actual spectrum. For example the software can adjust the size of the signals so they have equivalent amplitudes, and then compare the amplitudes at a large number of different frequencies.

As an alternative, the operator may set the system to perform regular bearing checks to determine whether and the amount of lubricant needed. Then, only if the signal is unusual will the operator initiate the automatic fault detection in order to determine the reason for the unusual signal. Operating in this fashion has the advantage that the operator does not need to input information about the bearings at each motor location, thus saving time. It is only when a problem appears that this needs to be done.

Thus, the software can calculate bearing defect fault frequencies or spectrums automatically based on specific bearing parameters input by a user. This software package can optionally be stored on a computer readable storage medium and run on hardware configured to execute the software. It is further envisioned that said software can be part of a control module executed as software and/or firmware on the ultrasonic detection instrument.

The software module of the present invention incorporates user input to automatically detect fault frequencies depending on one of the four types of bearing faults. Since the defects generated by outer race defects; inner race defects; ball defects; and bearing cage defects generate a specific frequency spectrum when the bearing is rotated at a specific speed, the present invention provides a unique system to identifying the particular defect. The present invention in the embodiment depicted in FIGS. 1 and 2, incorporates user supplied values corresponding to the number of ball elements within a bearing and the revolutions per minute (RPM) that the bearing is anticipated to rotate. Those skilled in the art will appreciate that the number of inputs is limited merely for the sake of demonstration purposes. It is envisioned that additional parameters indicated or customized by the user could be incorporated into fault detection system of the present invention.

Instead of using automatic spectrum comparison as provided by the described software modules, the comparison can be performed manually by the operator. In particular, after the user inputs the bearing parameters into the program, the user can look at the calculated fault frequency spectrum and then simply use a selection box 101 to select each of the four possibly general types of bearing faults. The user can then easily determine visually which one is the "best fit" for the displayed frequency spikes. The display device of FIG. 2 is a standalone spectrum analyzer, but the cursor function can be incorporated into the display screen 20 on the handheld device shown in FIG. 4.

The user can also access the Harmonic Cursor box 103, to configure the system to determine if the major frequency spikes of the chosen fault have matching harmonics with those of the actual signal.

While manual detection of the type of fault saves expense, the automatic detection may save time during testing. Whether manual or automatic modes are used, the present invention makes it is possible for a user lacking extensive experience in fault detection to in fact make an accurate determination of the location and nature of a fault. The ease of this determination insures that little training is required on the part of the operator. Furthermore, error prone calculations that are usually necessary for this type of fault detection are performed by the software module, and hence a greater degree of accuracy is achieved.

Through the preferred embodiments of invention the traditional vibration training for fault detection which requires many hours of formalized classroom study, is eliminated. Traditional vibration training requires a technician to spend a great deal of time being exposed to varying fault conditions so as to accurately identify them based on audible sound analysis. Additionally, the number of hours of practical experience a fault detection practitioner would need is greatly minimized.

It is envisioned that the present invention, when combined with ultrasonic detection equipment is suitable for applications wherein traditional vibration analysis information is either difficult or impossible to attain. These applications include slow speed bearings, high vibratory equipment such as vibratory feeders. These situations are where the ultrasound acquisition of data is easy and meaningful analysis of fault location and type can be obtained with ease by an unskilled practitioner using the present invention.

It is further envisioned that the present invention can be configured to run on a PDA or smartphone with the proper accessories connected. In this way, the hand held unit can be configured from existing hardware platforms and integrated into a testing regime that does not require specialty hardware apart from the ultrasonic transducers.

Figure 3A:
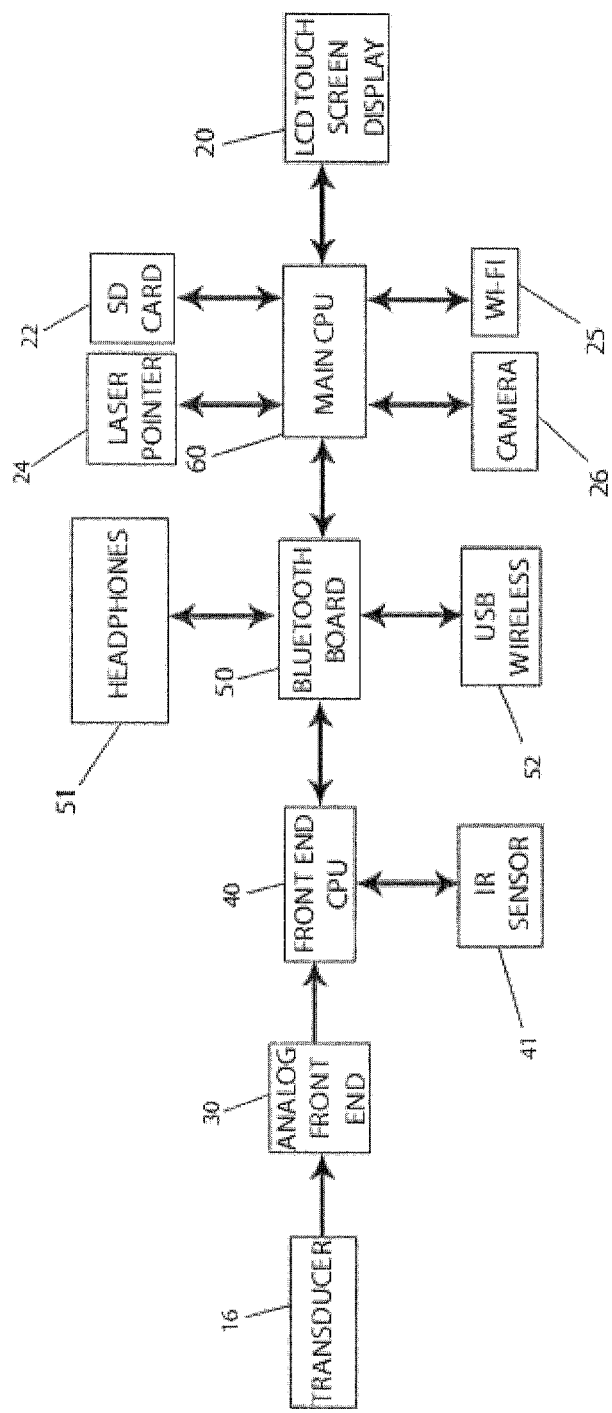
FIG. 3A is a block diagram showing the interconnected nature of modules incorporated into the present invention.

With respect to FIG. 3A, the software module of the present invention is incorporated into the ultrasonic detector, which is then further connected to the lubrication tool (such as a grease gun). It is further envisioned that the steps of the flow chart of FIG. 1 can be simulated as a series of modules executed on a sufficiently configured computer system. Applicant herein provides a description of the present invention as imbedded within a portable ultrasonic detection device. However, those skilled in the art will recognize that the present invention can be run as a discrete module within any configurable hardware, including desk top and notebook computer systems.

In an embodiment of the invention, the fault calculator module is imbedded in a control module having connections to a user input device, a display device and ultrasonic transducer. The ultrasonic transducer(s) is contained within a portable housing and is connected to the ultrasonic circuitry by wires that lead to the control circuitry and computer circuitry containing the software modules. The transducer can be attached to the handheld device housing. Alternatively, the transducer can be attached by any other mechanism that places it in acoustical contact with the device, e.g., motor housing bearings, to be measured.

When a mechanical device is in use, internal friction results in the generation of ultrasound. As lubrication is applied and reaches the friction or ultrasound generating surfaces, the intensity of the generated ultrasound is reduced. Coupling an ultrasonic detector with a lubrication tool, such as a grease gun, allows a single user to apply lubrication to a mechanical device while simultaneously monitoring the intensity of ultrasonic energy generated by that device. This allows the user to see when the detected ultrasonic energy drops to its lowest level, and thus when enough lubrication has been applied.

The control unit, which contains the software module, including the fault detector calculation module, of the ultrasonic device is further capable of updating a database with information gained from a grease dispenser, such as the amount of grease available to dispense, the quantity of grease dispensed and/or the position and time of dispensing actions. This information can be wirelessly transmitted to a remote device, such as a smart phone (Blackberry or I-phone), or portable computer.

It is envisioned that previously stored data concerning the physical environment are available to the control unit of the ultrasonic hand-held device. The device would be capable of providing structural and historical information, and has the capacity to take measurements of the environment. As described above in connection with FIG. 1, it was assumed that FFT spectra were available for the types of bearings in use at the facility where the testing is being carried out. However, such may not be the case. Nevertheless, the storage capability of the device will allow a library to be built of fault spectra for different bearings operating at different speeds with different numbers of balls. This information can even be associated with particular motors and environmental conditions.

A still further embodiment includes infrared temperature sensor 41 (FIG. 3A). Frequently failing bearings or arcing transformers have a higher temperature than devices operating normally. Thus, under the control of the processor or control unit the temperature can be recorded to assist in failure prediction. The temperature measurement, like the other measurements can be stored in the file for the device under test and can be compared manually or by the control unit to prior measurements as a way of diagnosing failures.

A block diagram of the circuits in the main body 14 (FIG. 4), that control the detector is shown in FIG. 3A. Physically an analog front end circuit 30, a front end CPU circuit 40, a Bluetooth circuit 50 and a main control unit, i.e., CPU circuit 60, are stacked together and connected by a bus which carries the primary signals, such as the audio signal WAV. It is envisioned that the fault detection calculator of the present invention is configured to be executable as an instruction set by the CPU circuit 60. It is further envisioned that the software module of the present invention, through the CPU, has access to the attached sensors, display devices, storage devices and input mechanisms.

The ultrasonic signal from bearings is picked up by the transducers and fed to the analog front end. In the front end 30 the signal is buffered, amplified and converted to a heterodyned audio signal WAV by heterodyne circuits. The front end CPU 40 is a sub-processor that carriers out detailed instructions from main CPU 60 (e.g., generating voltages to set the sensitivity and frequency in response to operator selection at the touch screen as interpreted by the main CPU and as shown in FIG. 4) and otherwise passes the WAY signal to the Bluetooth circuit 50. The front end CPU also receives sensor signals, e.g., battery life signals and temperature signals from the IR temperature sensor 41, and sends them to the main CPU for analysis. The Bluetooth circuit 50 prepares the WAV signal for transmission to wireless headphones 51 and also passes it through to the main CPU. Further, the Bluetooth circuit provides a wireless USB port 52 for wide range communication of the WAV signal.

The main CPU 60 controls all of the functions of the detector. It converts the WAV signal to a spectrum by performing a Fast Fourier transform (FFT) on a portion of it. The outputs of the main CPU are displayed on touch screen 20. Further, it controls a laser pointer 24 as well as stores data in and retrieves from an SD memory 22. A camera and flash 26 are also controlled by the main CPU and receive images from the camera for display on screen 20 and storage in SD memory 22. A Wi-Fi module 25 can also be operated by the main CPU 60. Finally, once lubrication is started by the operator, the CPU 60 can determine automatically when to stop the lubrication to prevent over lubrication of the bearings.

Figure 3B:
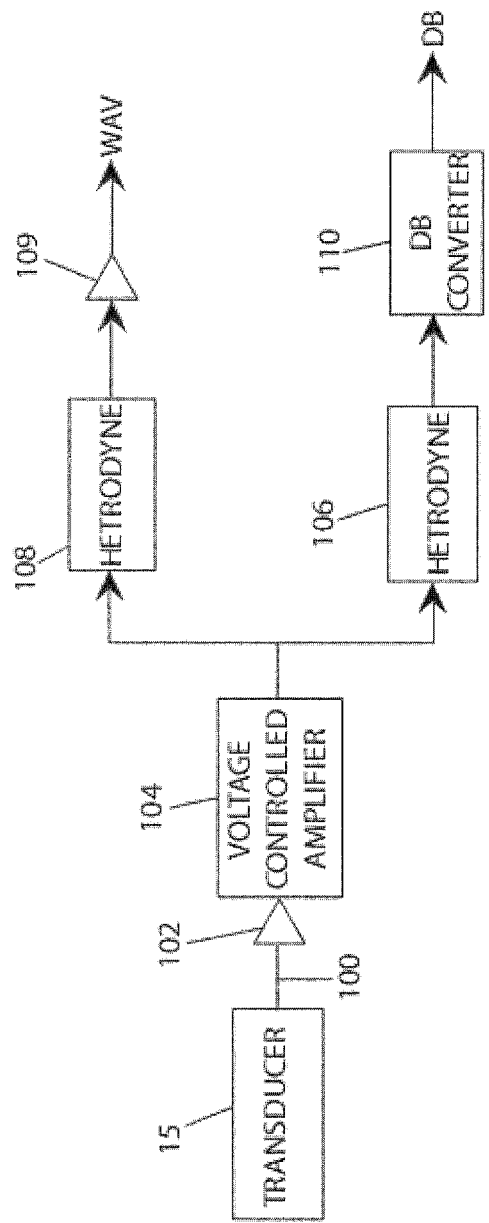
FIG. 3B is a block diagram showing the interconnected nature of additional modules incorporated into the present invention.

As seen in FIG. 3B the ultrasonic signal is fed to first heterodyne circuit 108 and separately to second heterodyne circuit 106. The heterodyne circuits convert the ultrasonic frequency signal to an audio signal. The audio output of the heterodyne circuit 106 is applied to the DB converter circuit 110, which generates a d.c. signal that is equivalent to the amplitude of the audio signal in db. This is applied to the main CPU which executes the software modules employing the fault frequency calculator, the output of which is shown on the screen 20.

The second heterodyne circuit 108 produces the WAV which is used by the CPU to drive the headphones and is subject to spectrum analysis.

As shown in FIG. 3A, the main CPU 60 and corresponding fault frequency calculator executable as software receive the WAY signal from Bluetooth board 50. They also have connections to the display 20, a real time clock 65 and two SD card slots in SD Card 22. One of the slots receives a high density SD card which provides system memory where WAV files can be stored along with photo images and spectrum signals. The main CPU controls all of the functions of the portable hand-held ultrasonic detector and allows user input and access to the fault frequency calculator module. In addition, it performs complex analysis of the WAV signal. For example, it can perform Fast Fourier Transforms on the WAV signal and can display the results on the screen.

Also, the module memory unit 22 is utilized by the processor. Within the memory 22 there is stored a base value, i.e., the value of the detected amplitude of ultrasonic energy when the device is operating properly. After receiving the signal to lubricate the device and causing the dispenser to start the flow of lubricant to the device, the processor 60 compares the base value to the signal from the ultrasonic detection module when the parts are moving. Based on this comparison, the processor causes the dispenser to cease the flow of lubricant when the signal substantially decreases. If the signal significantly decreases, it is a good indication that sufficient lubrication has been applied. Also, in the prior art the operator had to look at the signal on his display and make a judgment when the signal had significantly decreased. Then the operator had to manually turn off the dispenser. This could lead to errors which could result in damage to the bearings from over or under lubrication. By automating this process more precise results are achieved.

In the case where the signal stops decreasing before a base value is reached, there is an indication that the bearings are significantly deteriorated and simple lubrication will not cure the problem. Without the automatic detection according to the invention there is a danger that an operator would continue to lubricate the bearings, possibly causing additional harm to the machine, and certainly wasting lubricant.

The ultrasonic level to which the signal increases a period of time after proper lubrication can be an indication of the stage of deterioration of the bearing. As indicated in applicant's U.S. Pat. No. 6,122,966 a reading of 8 dB above the base value may indicate a pre-failure stage, a reading of 16 dB may indicate the beginning of the failure stage, while a reading of 35-50 dB may indicate a catastrophic stage of deterioration requiring immediate replacement to avoid a highly dangerous condition. With the present invention these levels can be stored in memory and the processor, in making its comparison, can direct a message to the display indicating the failure condition. Further, to the extent the fault calculation software is not running continuously, such a signal may indicate that it should be turned on either manually or automatically. In this way, it will be known to the operator not only that there is a failure, but the type of failure, which may help in making repairs.

Storage of prior heterodyned audio signals and/or spectrums is provided by removable memory cards such as SD memory cards 22. This allows information to be easily uploaded to a central computer or downloaded to the portable hand-held ultrasonic detector. As a result of this storage capacity, the diagnosis of the fault condition can be even more precise because the heterodyned audio and/or spectrum at one or more past times can be compared in real time to the current sound and/or spectrum on the portable device at the location of the test motor. Using the Bluetooth and Wi-Fi connections, a central maintenance operation can be immediately notified of an imminent fault detected in this manner.

Images, including those depicted in FIG. 2 as well and additional control data and other spectra may be shown on LCD screen 20 provided on the portable ultrasonic detector. The LCD screen may be a touch screen so that controls for operating the system and inputting data may also be provided on the screen in the form of a graphical user interface. The equipment can thus be used in dirty environments, since the use of a touch screen can prevent fine dirt particles from damaging the controls. The Wi-Fi and Bluetooth functions also provide the invention with the ability to connect with any wirelessly equipped stand-alone information recording device. By way of a non-limiting example, the present invention can share data and control the functions of an optical or strobe tachometer, IR camera, vibration analyzer or any other device configured for environmental sensing. As such, data gathered by the diagnostic tool prior to or during a maintenance operation can be stored or accessed via a network communication from any network accessible device. Thus, the information from these various external sources can be combined into a single source of information at the detector.

It is envisioned that a user of the invention will have access via a network to a storage facility with a database. Through that access, the user can then transmit continuous data to the network for remote analysis or storage. It is further envisioned that the database will have selectable data entries that will be available to the user for uploading or will permit the user to collaborate in the analysis of data captured by the present invention.

Another feature of the present invention is the capability to locally transmit data via an ad-hoc network to PDAs, smart phones, netbooks, tablets, or other data display and processing platforms. It is also envisioned that the data generated by the claimed invention can be accessed or remotely viewed via mobile platforms.

The data captured and transferred to a local or remote storage device can be, without limiting the disclosure thereof, heterodyned audio data, temperature data, spectrographic data, visual information, video data, directional and vibration data or any configured mechanism to capture data on physical conditions and phenomena. By way of non-limiting example, either local or networked data can be provided to the handheld device, or base station equipped with the FFT fault calculator control module, and be used to continuously adjust user feedback systems for devices that have variable parameters, such as changing temperature gradients, variable speeds, etc. For example the tempo or cadence of an alarm can be controlled in order to correspond to the variable conditions within a device to be analyzed.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed:

1. A handheld fault detector for detecting fault conditions in a device that generates characteristic ultrasonic signals, the detector comprising:
   an ultrasonic transducer module configured to receive an ultrasonic signal from the device and to generate an output electrical signal related thereto;
   a control unit configured to control the operations of the detector;
   a memory for storing operating instructions for the control unit and reference fault spectra data for a particular configuration of the device; and
   a fault calculation module integral to the control unit and configured to detect the fault condition by generating time series analysis and a Fast Fourier Transform of the electrical signal as a frequency spectrum and comparing the generated frequency spectrum to the reference fault spectra data to determine if there is a sufficiently close match.

2. The fault detector of claim 1 wherein the reference fault spectra data relate to at least one configuration of the device, and further including:
   a user input device for providing the configuration of the device under test; and
   a spectra modification unit that modifies one of the reference fault spectra data and the generated spectra data when the configuration of the device under test differs from the configuration for the reference fault spectra so as cause the compared spectra to correspond to the device under test.

3. The fault detector of claim 2 wherein the device has rotary motion supported by a number of ball bearings that generate the characteristic ultrasonic signals.

4. The fault detector of claim 3 wherein the configuration of the device includes at least one of the number of ball bearings and a speed of the rotary motion; and
   wherein the reference fault spectra data include at least one of outer race defects, inner race defects, ball defects and bearing cage defects.

5. The fault detector of claim 1, wherein the ultrasonic transducer module further comprises a heterodyne circuit for converting the received ultrasonic signal into an audio signal and outputting the audio signal to the control unit; and wherein the Fast Fourier Transform and time series analysis is derived from the audio signal.

6. The fault detector of claim 1 further including a display device for displaying the generated spectra, modified spectra and reference spectra alone or simultaneously in various combinations.

7. The fault detector of claim 1 further including a grease dispensing tool configured to be activated by the control unit.

8. The fault detector of claim 1 further including a temperature sensor configured to output a signal related to the temperature of the device under test to the control unit, and wherein the control unit uses the device temperature to predict a fault condition of the device.

* * * * *